United States Patent [19]
Monzello et al.

[11] Patent Number: 5,428,831
[45] Date of Patent: Jun. 27, 1995

[54] SIGNAL PATH LENGTH CORRELATOR AND METHOD AND AN INTERFERENCE CANCELLATION SYSTEM USING THE SAME

[75] Inventors: Roy C. Monzello, Agoura Hills; Albert Y. Lin, West Hills, both of Calif.

[73] Assignee: American Nucleonics Corporation, Westlake Village, Calif.

[21] Appl. No.: 2,824

[22] Filed: Jan. 8, 1993

[51] Int. Cl.⁶ .............................................. H04B 1/10
[52] U.S. Cl. ..................................... 455/296; 455/84; 455/278.1
[58] Field of Search .................. 455/24, 63, 84, 278.1, 455/295, 296, 304–306, 214; 329/318–320

[56] References Cited

U.S. PATENT DOCUMENTS

| | | |
|---|---|---|
| 3,699,444 | 10/1972 | Ghose et al. |
| 4,475,243 | 10/1984 | Batlivala et al. ............... 455/24 X |
| 4,493,111 | 1/1985 | Ganem ............................ 455/24 X |
| 4,952,193 | 8/1990 | Talwar. |
| 5,140,699 | 8/1992 | Kozak. |

OTHER PUBLICATIONS

Ghose, "Collocation Of Receivers And High-Power Broadcast Transmitters", *IEEE Transactions On Broadcasting* 34: 154–158 (1988).

*Primary Examiner*—Reinhard J. Eisenzopf
*Assistant Examiner*—Chi H. Pham
*Attorney, Agent, or Firm*—Hoffmann & Baron

[57] ABSTRACT

A method for compensating for time mismatch between an interference signal path and a cancellation signal path in an interference cancellation system involves two cross correlation steps. The first cross correlation establishes a baseline by correlating a reference signal at a synchronous detector of the interference cancellation system with a reference signal through a signal controller and error signal path of the system, which is the signal route from a sample coupler of the interference cancellation system to the synchronous detector by which the residual cancellation signal is measured. When this process is taking place, external signals from the air path are eliminated by using an isolation switch in the receive signal path of a radio receiver system to which the interference cancellation system is coupled. The second correlation is performed between the reference signal at the synchronous detector and the external interference through the error signal path. This process is accomplished with the signal controller set to maximum attenuation and the isolation switch in the low loss state. Using the correlation results, the time mismatch can be found by comparing the position of the correlation nulls between the two correlation responses. The time difference between the correlation nulls corresponds directly to the time match between the two propagation paths. The cross correlations are performed by a signal correlator forming part of an interference cancellation system.

16 Claims, 4 Drawing Sheets

SIGNAL PATH LENGTH CORRELATOR AND METHOD AND AN INTERFERENCE CANCELLATION SYSTEM USING THE SAME

BACKGROUND OF THE INVENTION

1. Field of the Invention

This invention relates to radio communication systems and methods, and more particularly relates to an interference cancellation system capable of providing improved interference suppression of wideband signals. Even more specifically, this invention relates to a signal path length correlator and method for use in an interference cancellation system for automatically calculating and adjusting for a time difference between the path length of an interference cancellation signal and a received interference signal to optimize suppression of the interference signal.

2. Description of the Prior Art

Operation of a receiver may be disrupted by interference signals generated from a collocated transmitter or a remote transmitter radiating within the same receiver passband. A collocated source usually interferes with the receiver due to the finite isolation between the transmit and receive antennas. Separating the transmitter and receiver in order to increase the isolation is oftentimes not possible, due to physical constraints such as in the case of an airborne platform. In the case of a remote transmitter, a stronger interference source will dominate the receiver and prevent the signal of interest from being detected. The solution to both problems of collocated and remote transmitters is to use an interference cancellation system.

An interference cancellation system takes a sample of an interference signal and adjusts the magnitude and phase such that the result is equal in amplitude and 180° out of phase with the interference signal at the receiver. The vector sum of the two signals will cancel, leaving only the signal of interest. In practice, however, the two signals are not identical, due to unwanted distortion in the reference path and differences in signal path lengths. Cancellation performance is a function of amplitude and phase match between the interference signal and the sampled signal. To suppress a wideband interference signal, the performance of a cancellation system is directly proportional to the path length match between the cancellation signal and the interference signal. For a modulated carrier, phase match is determined by the signal bandwidth and the path length difference in time (often measured in nanoseconds) between the transmit antenna to the receive antenna signal path and the sampled reference signal path to the receive antenna.

In order to provide good signal suppression, the cancellation signal path length should be adjusted to time match the interference signal path length. Contemporary techniques for this adjustment involve manual measurements to determine the path length difference between the interference cancellation signal and the received interference signal. More specifically, the presently used method of time matching the cancellation signal path and the interference signal path employs external equipment to observe the cancelled waveform while adjusting the cable length (i.e., the electrical length) of the cancellation signal path to achieve maximum cancellation, which is synonymous with good time match. This procedure is performed only once during installation and requires specially trained personnel. The same measurement must be repeated whenever the system configuration is changed. The conventional method does not lend itself to situations where the time match may change over the course of time as a result of a changing environment. Thus, a conventional interference cancellation system may suffer a loss of suppression performance due to system dynamics.

OBJECTS AND SUMMARY OF THE INVENTION

It is an object of the present invention to provide a method and apparatus for automated adjustment of the time match between the interference signal path and the cancellation signal path in an interference cancellation system.

It is another object of the present invention to provide a signal path length correlator for use in an interference cancellation system which enhances the performance of the cancellation system to allow good suppression of wideband interference signals.

It is yet another object of the present invention to provide an interference cancellation system and method which automatically calculates the time difference between an interference signal path and a cancellation signal path of the interference cancellation system to optimize suppression of wideband interference signals.

It is yet a further object of the present invention to provide an interference cancellation system and signal path length correlator for use in the system, which correlator may be activated periodically to compensate for system dynamics or when the system configuration is changed, in order to maintain high performance of the cancellation system.

In accordance with one form of the present invention, a method for compensating for time mismatch between an interference signal path and a cancellation signal path in an interference cancellation system is provided. An interference cancellation system is coupled between a radio receiver system, which generally includes a receive antenna, a receiver and a transmission line interconnecting the receive antenna and the receiver and defining a receiver signal path, and the cancellation system is further connected to a source of an interfering signal, either directly to the source, such as a transmitter, or by receiving an interfering signal through an auxiliary antenna.

Basically, an interference cancellation system includes a synchronous detector, a signal controller coupled to the synchronous detector, a summer coupler, which connects the signal controller to the receive signal path, a sample coupler, which is coupled to the receive signal path and generates an error signal representative of a residual interfering signal on the receive signal path and provides the error signal to the synchronous detector, and a reference coupler (or, alternatively, an auxiliary antenna) which is coupled to the interfering signal source and samples the interference signal and generates a corresponding reference signal which is provided to the synchronous detector and the signal controller.

The interference signal path may be defined as the signal path external to the interference cancellation system from the reference coupler to the summer coupler, for example, through the transmit antenna and receive antenna and to the summer coupler. The cancellation signal path may be defined as the signal path internal to the interference cancellation system from the reference coupler through the signal controller preferably to the summer coupler. The signal controller preferably has an insertion loss which is adjustable between a high and a low value.

The method of the present invention, for compensating for time mismatch between the cancellation signal path and the interference signal path, includes the step of setting the insertion loss of the signal controller to the high value, and, if not done so already, coupling the receive antenna to the receive signal path. The method then includes the step of cross correlating the received interference signal (which is on the receive signal path) and the reference signal and generating first cross correlation data in response thereto. Correlation is performed by incrementally time shifting one of the two signals, multiplying the two signals after each time shift and integrating the result. The first cross correlation data exhibits either a peak or a null in amplitude, which peak or null occurs at a first particular total time shift.

The method then includes the step of setting the insertion loss of the signal controller to the low value, and decoupling the receive antenna from the receive signal path. Then, a cross correlation is performed between the output signal of the signal controller and the reference signal, and generating second cross correlation data in response thereto. The second cross correlation data exhibits either a peak or a null in amplitude which occurs at a second particular total time shift.

In summary, two cross correlations are needed to calculate the time mismatch between paths. Time match is a relative measure of the time difference between the two paths taken by the interfering signal at the receive antenna and the path taken from the reference source (a sample coupler in the collocated case) through the interference cancellation system to the summer coupler, where the interference signal and the cancellation signal are added. The first cross correlation establishes a baseline by correlating the reference signal at the synchronous detector with the reference signal through the signal controller and error signal path, which is the signal route from the sample coupler to the synchronous detector by which the residual cancellation signal is measured. When this process is taking place, external signals from the air path are eliminated by using the isolation switch in the receive line that terminates the antenna into an appropriate load. The second correlation is performed between the reference signal at the synchronous detector and the external interference through the error signal path. This process is accomplished with the signal controller set to maximum attenuation and the isolation switch in the low loss state.

The method further includes the step of determining the time shift difference between either the occurrences of peaks in the first and second data or nulls in the first and second data, i.e., the difference between the first and second measured time shifts. This difference in time is representative of the time mismatch between the interference signal path and the cancellation signal path in the interference cancellation system. After the time difference is calculated, the electrical length of either the interference signal path or the cancellation signal path is adjusted in accordance with the determined time difference.

An interference cancellation system formed in accordance with the present invention basically includes all of the system components mentioned previously, except that it further employs a signal path length correlator, formed in accordance with the present invention, which includes a synchronous detector such as the one mentioned previously. More specifically, the signal path length correlator receives the reference signal as well as the error signal, and includes an adjustable delay line for incrementally time shifting either the reference signal provided to one its input ports, or whichever signal is being compared to the reference signal, i.e., the received interference signal through the receive antenna during one cross correlation or the output signal of the signal controller during the other cross correlation, provided to the other input port of the correlator. The output of the adjustable delay line is provided to the synchronous detector incorporated into the correlator.

The synchronous detector has basically two outputs, commonly referred to as an "I" and "Q" output, on which is generated an amplitude and phase adjustment signal which is provided to the signal controller so that the signal controller may generate a cancellation signal which is adjusted in amplitude and phase to cancel the received interference signal in the receive signal path. Either one of the amplitude and phase adjustment signals is provided to an integrator of the correlator, such as a low pass filter, and the filtered signal is provided to a computer or microprocessor.

The correlator will conduct a cross correlation between the received interference signal and the reference signal by incrementally adjusting the delay line over a predetermined period of time and, after each adjustment, measure the amplitude of the filtered signal and store the measured amplitude in the computer. The correlator then cross correlates the output signal of the signal controller and the reference signal by incrementally adjusting the delay line and storing the cross correlation data, i.e., the measured amplitude of the filtered signal from the correlator for each increment in time, in the computer.

After the first and second cross correlations are completed, the computer will calculate the total time shift which was needed to cause a null in the amplitude of each set of data (although times of peak amplitude may be compared) and calculate the difference in time shifts between when the nulls in the first and second cross correlation data occurred.

A delay line which is situated in the cancellation signal path and which may be directly incorporated into the signal controller is adjusted by the computer in accordance with the measured time shift difference between the nulls in the two sets of cross correlation data. The measured time difference represents the time mismatch between the interference signal path and the cancellation signal path, and the delay line in the cancellation signal path will compensate for the mismatch.

It should be noted that either cross correlation may be conducted first, in accordance with the present invention, that is, the output signal of the signal controller may be cross correlated with the reference signal, and then the received interference signal may be cross correlated with the reference signal, as long as the precorrelation steps, such as setting the insertion loss of the signal controller to the desired value and either decoupling or coupling the received antenna to the receive and signal path, are performed.

These and other objects, features and advantages of this invention will become apparent from the following detailed description of illustrative embodiments thereof, which is to be read in connection with the accompanying drawings.

DETAILED DESCRIPTION OF THE PREFERRED EMBODIMENTS

Figure 1:
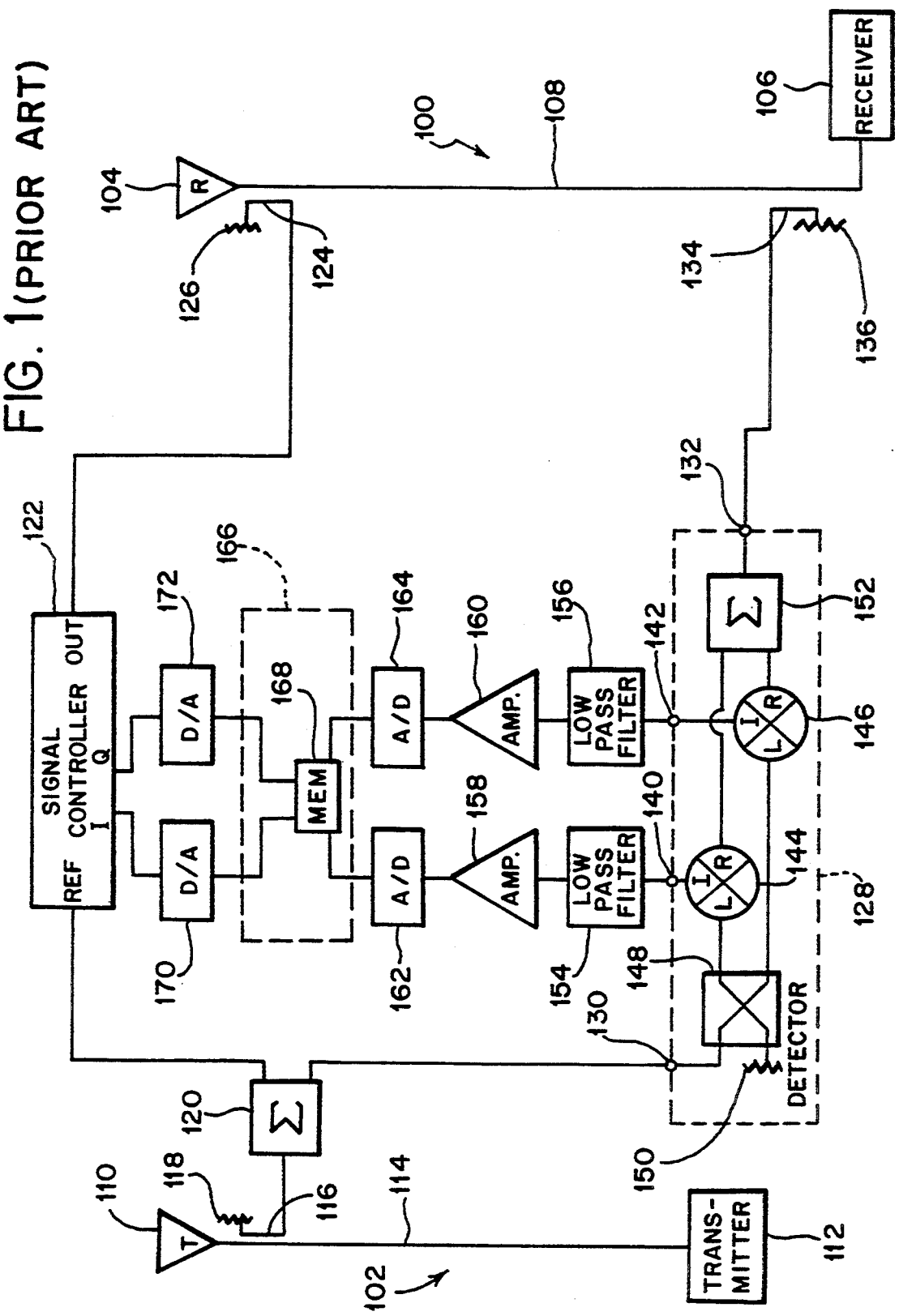
FIG. 1 is a functional diagram of a conventional interference cancellation system.

To facilitate an understanding of the present invention, a conventional interference cancellation system will now be described with reference to FIG. 1 of the drawings.

The interference cancellation system is adapted to be connected to a radio receiver system 100 as well as a radio transmitter system 102. The radio receiver system 100 includes a receive antenna 104, a receiver 106 and a receiver transmission line 108 connecting the receive antenna to the receiver. Similarly, the radio transmitter system 102 includes a transmit antenna 110, a transmitter 112 and transmitter transmission line 114 connecting the transmit antenna to the transmitter.

The signal transmitted by the transmit antenna 110 is received by the receive antenna 104 of the radio receiver system and thus interferes with the reception of a desired signal in the radio receiver system. This problem may be especially acute when the transmitter and receiver are collocated. Hence, there is a need for an interference cancellation system to cancel the interfering signal in the radio receiver.

The transmit signal of the radio transmitter system 102 is sampled by using a first directional coupler, which is also referred to as a reference coupler 116, which is connected to the transmitter transmission line 114. One output of the coupler is terminated using an appropriate termination 118, and the other output is provided to the input of a first power divider or summer 120. The first power divider 120 includes at least two output ports on which are provided a first reference signal and a second reference signal, each of which corresponds to the sampled transmit signal.

The interference cancellation system includes a signal controller 122. The signal controller 122 has a reference signal (REF) port to which the first reference signal is provided, and includes an output (OUT) port on which a cancellation signal is provided. The signal controller 122 effectively adjusts the phase and amplitude of the first reference signal (which corresponds to the sampled transmit signal), and provides a cancellation signal adjusted in phase and amplitude which may be injected into the receiver transmission line 108 to cancel the corresponding interfering signal received by the radio receiver system. The signal controller 122 further includes in-phase (I) and quadrature phase (Q) control signal input ports, on which are received control signals to which the signal controller responds in adjusting the phase and gain of the cancellation signal. The cancellation signal is provided to one input of a second directional coupler, also referred to as a summer coupler 124, the other input of which is terminated using an appropriate termination 126. The summer coupler 124 is coupled to the receiver transmission line 108 of the radio receiver system 100.

As with generally all conventional interference cancellation systems, the interference cancellation system described herein also includes a detector, shown generally by the dashed line 128. The detector 128 includes a reference signal port 130, which receives the second reference signal, and an error signal port 132, which receives an error signal.

The error signal is provided by having a third directional coupler, also referred to as a sample coupler 134, coupled to the receiver transmission line 108. The sample coupler 134 includes two outputs, one of which is terminated with an appropriate termination 136. The other output provides the error signal, which is essentially a sample of the desired signal received by the receive antenna 104 and the radio receiver system 100, and the residual interfering signal present after the cancellation signal is injected. This error signal is provided to the error signal port 132 of the detector. The detector 128 includes first and second output ports 140, 142 on which are respectively provided analog in-phase and quadrature phase DC signals that correspond to the amplitude of the residual in-phase and quadrature phase components of the interfering signal.

The detector 128 of the interference cancellation system basically includes a quadrature hybrid 148. A first input port of the quadrature hybrid is connected to the reference signal port 130 of the detector, and a second input port of the hybrid is terminated using an appropriate termination 150.

The quadrature hybrid 148 includes two output ports. The second reference signal which is provided to the first input port of the hybrid is divided into an in-phase reference signal on one output port, and a quadrature phase reference signal on the other output port. The in-phase and quadrature phase reference signals are 90° out of phase with one another.

The error signal on the error signal port 132 of the detector is provided to the input port of a second power divider 152 of the detector. The second power divider 152 includes two output ports, and the error signal is divided into first and second secondary error signals provided to the output ports of the power divider. The first and second secondary error signals are in phase with each other.

The synchronous detector 128 may employ a first mixer 144 and a second mixer 146. Each of the first and second mixers 144, 146 of the detector includes a local oscillator (L) input port, an RF or radio frequency (R) input port and an IF or intermediate frequency (I) output port. The in-phase reference signal from the quadrature hybrid 148 is provided to the L input port of the first mixer 144, and the first secondary error signal is provided to the R input port of the first mixer 144. The quadrature phase reference signal from the quadrature hybrid 148 is provided to the L input port of the second mixer 146, and the second secondary error signal from the second power divider 152 is provided to the R input port of the second mixer 146. The in-phase DC error signal is generated on the I output port of the first mixer 144 and is provided to the first output port 140 of the detector, and the quadrature phase DC error signal is generated on the I output port of the second mixer 146 and is provided to the second output port 142 of the detector.

The in-phase and quadrature phase DC error signals provided on the output ports of the detector are provided to the inputs of a first low pass filter 154 and a second low pass filter 156, respectively. The outputs of the first and second low pass filters are connected to the inputs of a first DC amplifier 158 and a second DC amplifier 160, respectively.

Many interference cancellation systems employ a digital control loop. Such systems are especially adapted for use in frequency agile applications, where the frequency of the transmit signal changes rapidly. In such a system having a digital control loop, the outputs of the first and second DC amplifiers 158, 160 are respectively provided to the inputs of first and second analog-to-digital converters 162 and 164, respectively. The analog in-phase and quadrature phase DC signals generated by the detector are digitized by the first and second analog-to-digital converters 162, 164, respectively, and the digitized error signals are provided to a control computer 166 comprising a portion of the control loop of the interference cancellation system.

As its name implies, the control computer 166 controls the amplitude of the in-phase and quadrature control signals provided to the signal controller 122. The control computer includes a memory 168, which functions at least in part as a look-up table. This table contains previously computed control signals for the signal controller, as a function of carrier frequency, to be applied to the signal controller digital-to-analog converters 170, 172 when each frequency occurs. As each carrier frequency occurs, the control computer 166 receives the digitized in-phase and quadrature phase DC error signals, applies them to the control equation and memory values for this particular frequency, and stores the results back in memory for the next occurrence of this particular frequency, and outputs the digital equivalent codes of the desired control signals. The control equation is the digital equivalent of an analog control loop, as is well known in digital control theory, and it is used to adjust the values of the signal controller control signals in such a way that the DC error signals are minimized, thus minimizing the interfering signal. The computer provides these digital codes to the inputs of first and second digital-to-analog converters 170 and 172, respectively, which generate the analog in-phase and quadrature phase control signals corresponding to the digital equivalent codes. The in-phase and quadrature phase control signals are provided to the signal controller 122 and cause the signal controller to adjust the phase and amplitude of the first reference signal to provide an appropriate cancellation signal. The above description of the conventional interference cancellation system is set forth in U.S. Pat. No. 5,140,699 which issued on Aug. 18, 1992 to John P. Kozak, the disclosure of which is incorporated herein by reference.

For further understanding the present invention, reference is again made to FIG. 1 of the drawings. The present invention relates to a method and apparatus for compensating for time mismatch between an interference signal path and a cancellation signal path in an interference cancellation system. The interference signal path may be defined as the signal path external to the interference cancellation system from the reference coupler 116, through the transmit antenna 110 and receive antenna 104 and to the summer coupler 124. The cancellation signal path may be defined as the signal path internal to the interference cancellation system from the reference coupler 116, through the signal controller 122 and to the summer coupler 124. As mentioned previously, the time mismatch between the interference signal path and the cancellation signal path, which at least in part is due to the differences in path lengths, is measured and eliminated or minimized so that the system does not suffer a loss in suppression performance. Also, the receive signal path may be defined as the signal path from the receive antenna 104 to the receiver 106.

Figure 2:
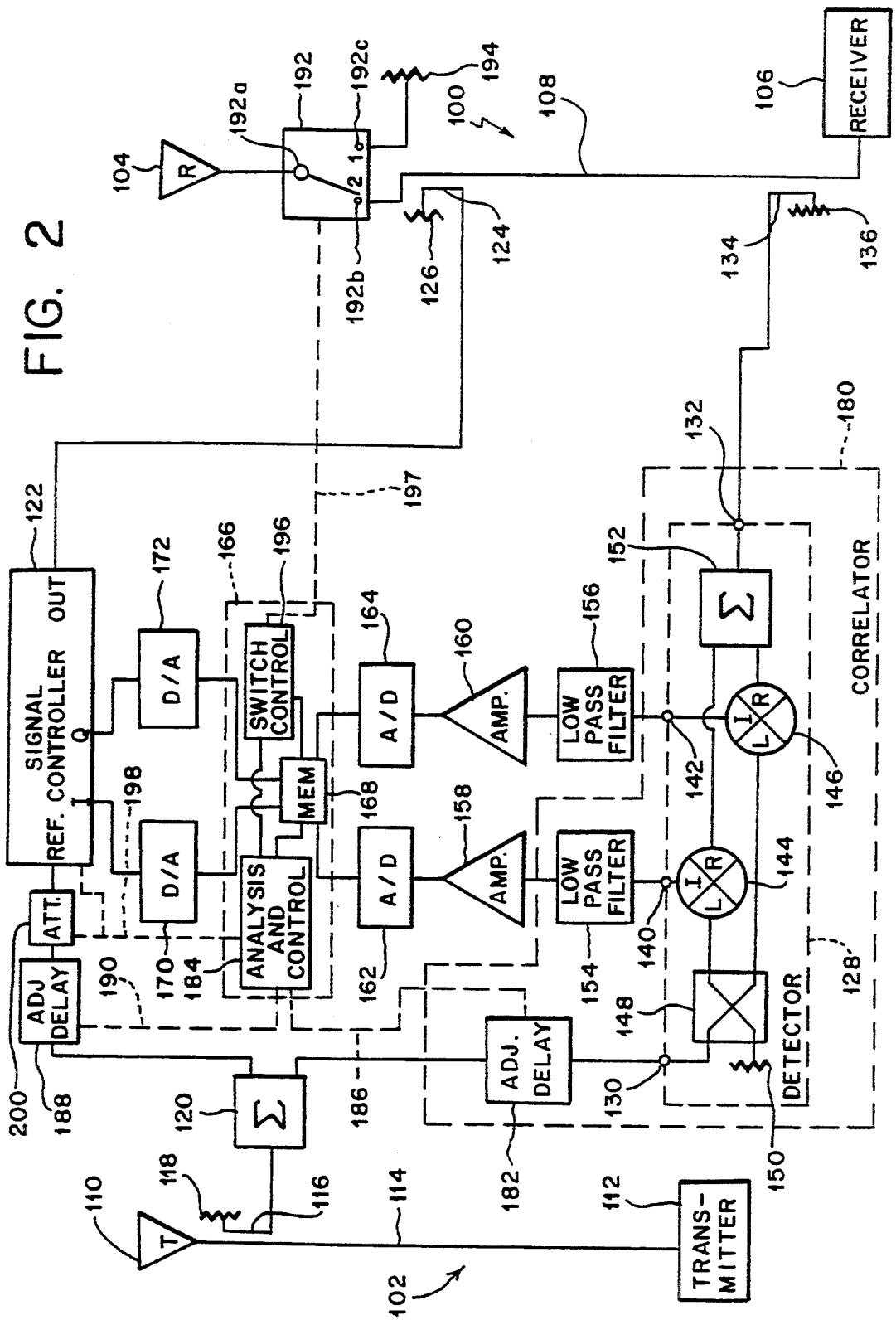
FIG. 2 is a functional diagram of an interference cancellation system of the present invention, incorporating the signal path length correlator and its associated components of the present invention.

An interference cancellation system employing the signal path length correlator of the present invention is shown in FIG. 2 of the drawings. As can be seen, the system incorporates all of the structure and basically operates in the same manner as that shown and described in relation to FIG. 1, with the improvements and differences described below.

The interference cancellation system includes a correlator 180 which performs two cross correlations, the first between the received interference signal and the reference signal, and the second between the output signal of the signal controller and the reference signal, as will be described in greater detail. The correlator 180, shown in dashed lines in FIG. 2, basically includes three components-an adjustable delay line 182, such as a programmable delay line, a signal multiplier for multiplying two signals, such as the synchronous detector 128 shown in FIG. 2, and an integrator, such as the low pass filter 154 shown in FIG. 2.

More specifically, the adjustable delay line 182 is situated in the reference signal path and interposed between the second reference signal output port of the first power divider 120 and the reference signal port 130 of the synchronous detector 128. Although the delay line 182 is shown as being situated in the reference signal path, it could alternatively have been situated in the error signal path between the error signal port 132 of the detector 128 and the sample coupler 134. The delay line 182 is programmable and controlled by an analysis and control section 184 of the control computer 166, as illustrated by dashed line 186, to provide a plurality incremental delays on command in order to perform the cross correlations.

The correlator 180 also includes the synchronous detector 128 which, as will be described, performs the cross correlations on the signals provided to the correlator. During cross correlation, the synchronous detector generates DC amplitude signals on its output ports 140, 142, either one of which may be used as correlation data. FIG. 2 shows that the signals provided on output port 140 of detector 128 are used, for example, as the correlation data.

The correlator 180 further includes an integrator or a low pass filter 154. The low pass filter 154 takes the selected output signal from the synchronous detector 128 and integrates the signals, in accordance with cross correlation theory. As shown in FIG. 2, low pass filter 154 is used as the integrator, the output of which provides the correlation data used in the calculation of the time mismatch. The correlation data, which is in effect a plurality of different DC amplitude voltages generated by the synchronous detector 128 for each time shift increment of the programmable delay line 182, passes through amplifier 158 and is digitized by analog-to-digital converter 162 and stored in the memory 168 of the control computer 166.

The peripheral components associated with the correlator include a second adjustable delay line 188, which also may be a programmable delay line. The second delay line 188 is situated in the cancellation signal path, such as between the first reference signal output port of the first power divider 120 and the REF input of signal controller 122. The second delay line 188 is also adjustable incrementally by the analysis and control section 184 of the control computer 166, as illustrated by dashed line 190, so that a selectable amount of time delay may be added to or subtracted from the cancellation signal path of the interference cancellation system.

Another component of the system is an RF antenna isolation switch 192, which is situated in the receive signal path of the radio receiver system. In FIG. 2, the RF switch 192 is shown as being preferably interposed between the receive antenna 104 and the summer coupler 124. The RF switch 192 acts as a single pole double throw switch, with the wiper terminal 192a being electrically coupled to the receive antenna 104, one pole 192b being electrically coupled to the receive transmission line 108 leading to the summer coupler 124, and the other pole 192c being connected to an appropriate termination 194. The movement of the wiper is controlled by a switch control section 196 of the control computer 166, as illustrated by dashed line 197. The control computer 166 will appropriately open and close switch 192 during a path length mismatch calculation.

The signal controller 122 also preferably has an insertion loss which is adjustable between a high and low value, which is controlled by the control computer, as illustrated by dashed line 198. Alternatively, a programmable attenuator 200 (or RF switch similar to switch 192) may be used in series with a nonadjustable signal controller, which attenuator may be controlled by the control computer 166.

It is envisioned that the correlator 180 may be implemented by using discrete components, but more preferably may be realized by an acoustic charge transport (ACT) device. The ACT device may function as both the programmable delay line 182 and as a programmable transversal filter (PTF) with digitally variable bipolar weighting at each of its taps to act in part as a synchronous detector. The signal controller 122 and the second programmable delay line 188, which is provided for time mismatch adjustment, are also realizable by using an ACT device.

A time mismatch between the interference signal path and the cancellation signal path is determined and compensated for in the following manner.

First, the interference cancellation system is preset to a particular state prior to cross correlating the received interference signal and the reference signal. More specifically, the insertion loss of the signal controller 122 or attenuator 200 is set to a high value or maximum insertion loss which may be, for example, about 40 dB. The antenna isolation switch 192 is also set by the control computer 166 to the low loss position (position 2), as shown in FIG. 2, so that the receive antenna 104 is coupled to the receive signal path and transmission line 108. A cross correlation is then performed.

There are three operations required in performing a cross correlation. These operations include time shifting of one of the input signals to the correlator 180; multiplying the two signals after each time shift, which multiplication is performed by the mixers 144, 146 within the synchronous detector 128; and integrating the result, as performed by filter 154.

The first cross correlation is performed between the interference signal received by receive antenna 104 and the reference signal provided to input port 130 of the synchronous detector 128. This cross correlation is performed by incrementally adjusting the programmable delay line 182. For each incremental adjustment of delay line 182, the synchronous detector correlates the reference signal provided to it on port 130 with the error signal (which is representative of the received interference signal) provided to it on port 132 and generates a DC voltage level on output port 140. This DC voltage level is passed through filter 154, which acts as an integrator. The signal generated by the synchronous detector 128 of the correlator 180 for each incremental delay of the delay line 182 is data which results from the first correlation performed. This data is amplified by amplifier 158 and digitized by analog-to-digital converter 162 and stored in the memory 168 of the control computer 166 for later analysis.

After a cross correlation is performed between the received interference signal and the reference signal and the first cross correlation data is generated and stored, a second cross correlation is performed, this time between the output signal of the signal controller 122 and the reference signal. Prior to conducting the second cross correlation, the insertion loss of the signal controller 122 or attenuator 200 is set to a low value or minimum insertion loss, and the switch control section 196 of the control computer sets the antenna isolation switch 192 to position 1, as shown in FIG. 2, so that the receive transmission line 108 is decoupled from the receive antenna 104.

The second cross correlation is then performed, which effectively correlates the output signal of the signal controller 122 with the reference signal provided to reference signal input port 130 of synchronous detector 128. The second cross correlation is also performed by incrementally adjusting the programmable delay line 182, and allowing the synchronous detector to generate a DC voltage level on output port 140 for each incremental time shift. The second data which is generated is integrated by filter 154, amplified by amplifier 158 and digitized by analog-to-digital converter 162, and then stored in memory 168 of the control computer for analysis.

Figure 3:
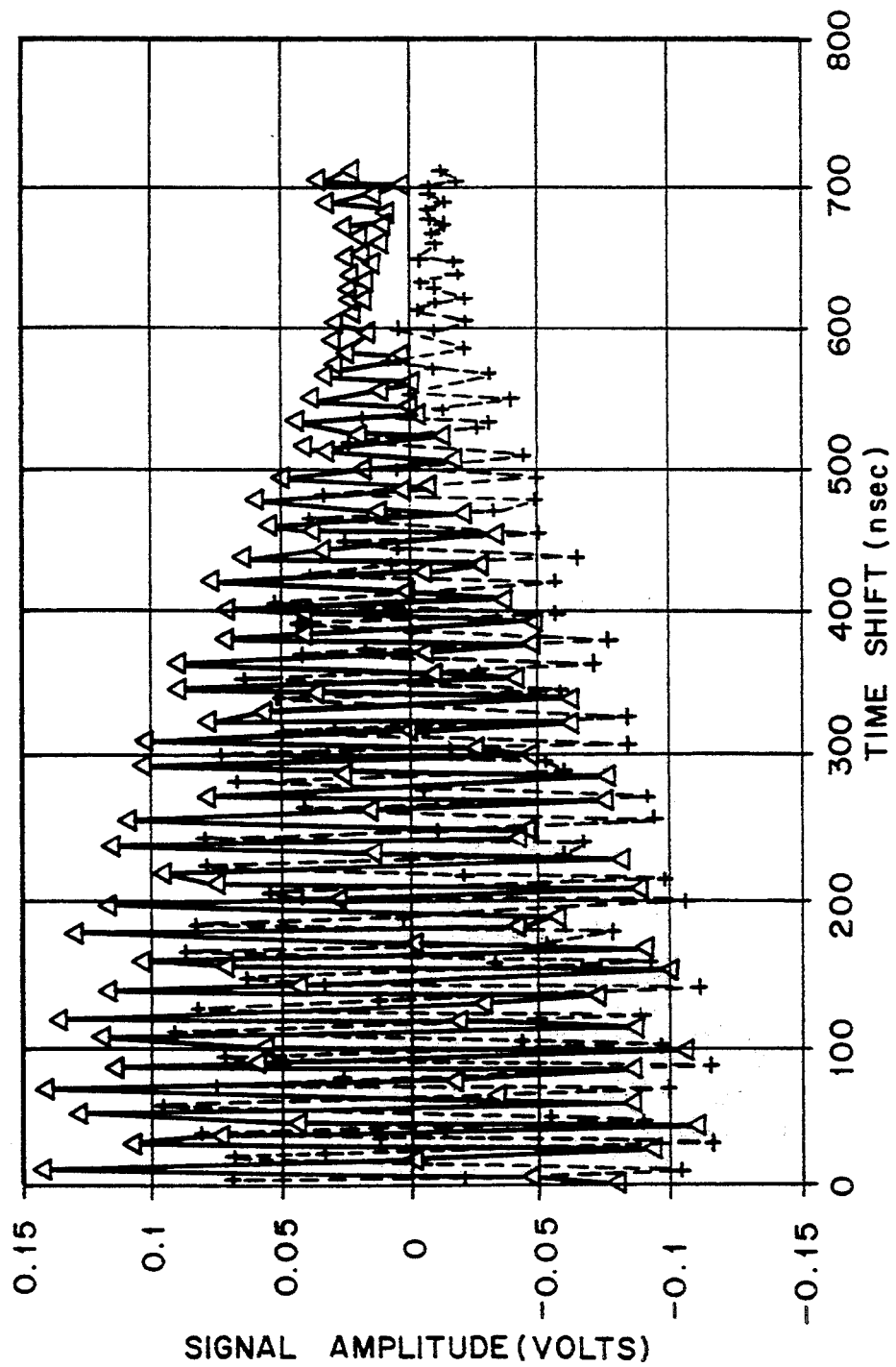
FIG. 3 is a composite graph of amplitude versus time shift comparing the correlation responses of two cross correlations for a frequency modulated interference signal, performed by an interference cancellation system formed in accordance with the present invention, for a case where the cancellation signal path and interference signal path have different lengths.

Each cross correlation produces data consisting of amplitude versus time shift. This data exhibits an amplitude null (or amplitude peak) that is a function of signal path length. A composite graph of this data for both correlations, measured during an actual test of the system with a frequency modulated (FM) interfering signal, is shown in FIG. 3, with an expanded view of the graph around the nulls shown in FIG. 4. To simplify the explanation of the invention, it may be assumed that the black triangles shown in FIGS. 3 and 4 represent the first cross correlation data and the plus signs (+) represent the second cross correlation data.

Figure 4:
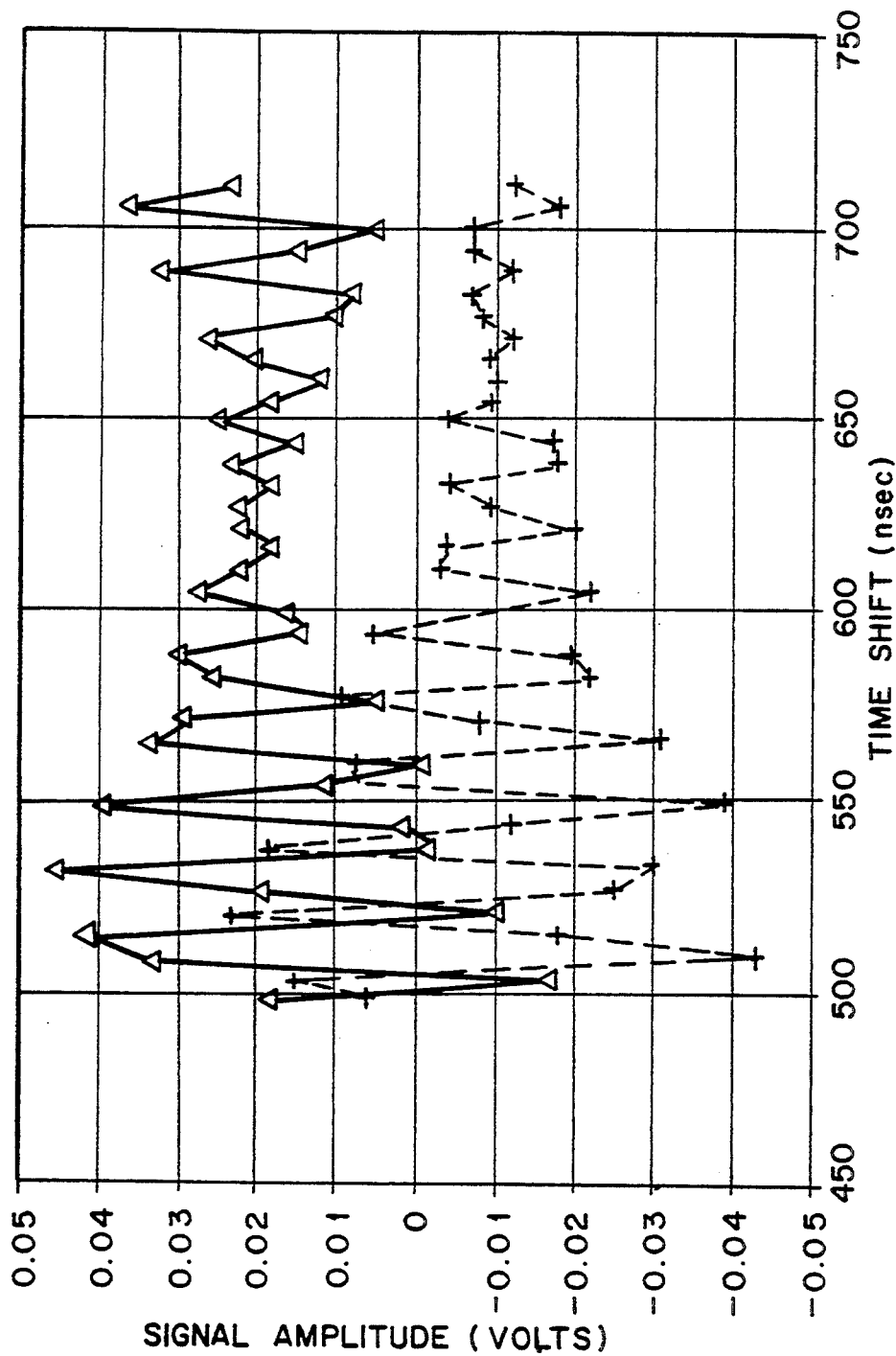
FIG. 4 is an expanded view of the graph shown in FIG. 3, comparing the correlation responses expanded around the nulls in each response.

As can be seen from FIGS. 3 and 4, data was taken at intervals or time shifts of 5.6 nsec, and the signal amplitude in volts of the data versus time shift was plotted in the graphs. It is clear from FIG. 4 that a null in the correlation response for the first cross correlation occurs around 625 nsec in time shift caused by the programmable delay line 182, and a null in the second cross correlation response occurs around 660 nsec.

Nulls in the correlation responses are preferably chosen rather than comparing peak amplitudes because a null is the most discernible point of reference for measuring the time difference between the two correlation responses. A null occurs because, at a particular time shift provided by delay line 182, the two signals provided to input ports 130 and 132 of the synchronous detector 128 will be 90° out of phase with each other, thus creating the null in amplitude on at least one of the outputs of the detector. Although the time occurrence of peaks in the correlation responses may be compared, the peaks are not as discernible as the nulls.

The analysis and control section 184 of the control computer 166 analyses the first and second cross correlation data and determines the time difference between the occurrence of the two nulls (or the occurrence of the two peaks). The example shown in FIG. 4 shows that this time difference is approximately 35 nsec. This time difference represents the time mismatch between the interference signal path and the cancellation signal path in the interference cancellation system. The analysis and control section 184 of the control computer 166 correspondingly adjusts the programmable delay line 188 in the cancellation signal path by this measured time difference to eliminate the time mismatch between the two paths, the delay line 188 being responsive to a time match control signal generated by section 184 on line 190.

After the delay line 188 is adjusted to eliminate any time mismatch, the control computer 166 causes the cancellation system to revert back to its normal operation, such as described in relation to the system shown in FIG. 1, and the antenna isolation switch 192 is returned to the low loss position (position 2), and the signal controller 122 or attenuator 200 is set to a desired or minimal insertion loss.

The signal correlator and method of the present invention automatically adjusts the time match in the interference signal path and cancellation signal path of an interference cancellation system and eliminates the currently used, manual procedure which is performed only once during installation and by specially trained personnel. The method of the present invention is an automated procedure which can be programmed to occur at regular intervals to compensate for any changes in the environment or to compensate for system dynamics or when the system configuration is changed. The automated procedure permits the interference cancellation system to operate at peak performance to suppress wideband interference signals. The system is designed such that the signal controller and the correlator may be implemented by using ACT devices.

It should be noted that, although the present invention has been described with collocated transmitter and receiver systems, the invention is suitable for use in time matching the interference signal path and cancellation signal path with a remotely located interfering signal source by using an auxiliary antenna in lieu of a reference coupler. The auxiliary antenna, in effect, samples the transmitted interfering signal and provides a corresponding reference signal to the signal controller and the correlator. The cancellation signal path would then be defined as the signal path from the interfering source through the auxiliary antenna, through the signal controller and to the summer coupler. The interference signal path would be defined as the signal path from the interfering source through the receive antenna and to the summer coupler.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An interference cancellation system for connection to a radio receiver system having a receive antenna, a receiver and a receiver transmission line electrically coupling the receive antenna to the receiver, the interference cancellation system being adapted to compensate for time mismatch between an interference signal path and a cancellation signal path in the interference cancellation system, which comprises:

means for generating a reference signal corresponding to a transmitted interfering signal;

means coupled to the receiver transmission line for generating an error signal representative of a received interfering signal;

a signal controller, the signal controller having at least a first input, at least a portion of the reference signal being provided to the first input of the signal controller, the signal controller having an insertion loss with respect to the first input, the insertion loss being adjustable between a high and a low value, the signal controller having an output and providing thereon a cancellation signal;

means coupled to the receiver transmission line and responsive to the cancellation signal for effectively injecting the cancellation signal onto the receiver transmission line carrying the received interfering signal, the interference signal path being defined as a signal path external to the interference cancellation system from the reference signal generating means to the cancellation signal injecting means, and the cancellation signal path being defined as a signal path internal to the interference cancellation system from the reference signal generating means to the cancellation signal injecting means;

a signal correlator, the signal correlator having first incrementally adjustable delay means, a synchronous detector and an integrator, the first adjustable delay means being responsive to the reference signal and generating a delayed reference signal in response thereto, the synchronous detector having at least first and second inputs, the first input being electrically coupled to the first delay means and receiving the delayed reference signal, the second input being electrically coupled to the error signal generating means and receiving the error signal, the synchronous detector having at least one output, the synchronous detector comparing the delayed reference signal and the error signal and generating an output signal in response to the comparison thereof, the integrator being electrically coupled to the at least one output of the synchronous detector and being responsive to the output signal thereof and generating a correlation data signal in response thereto and in response to incremental adjustments of the first delay means;

an RF switch coupled to the receiver transmission line for selectively decoupling the receive antenna from the transmission line, the RF switch being switchable between a first position in which the receive antenna is decoupled from the receiver transmission line and a second position in which the receive antenna is coupled to the receiver transmission line;

means electrically coupled to the signal controller for controlling the insertion loss of the signal controller;

means electrically coupled to the RF switch for controlling the position of the switch;

means for analyzing the correlation data signal and for generating a time match control signal in response thereto, the correlation data signal analyzing means, the insertion loss controlling means and the RF switch position controlling means being operatively coupled together; and second adjustable delay means situated in the cancellation signal path, the second delay means being responsive to the time match control signal and effectively adjusting the electrical length of the cancellation signal path in response thereto.

2. A method for compensating for time mismatch between an interference signal path and a cancellation signal path in an interference cancellation system, the interference cancellation system being coupled to a radio receiver system having a receive signal path and a receive antenna coupled to the receive signal path, the interference cancellation system including a synchronous detector, a reference signal path on which a reference signal representative of an interfering signal is provided to the synchronous detector, an error signal path on which an error signal, representative of a residual interfering signal of the radio receiver system to which the interference cancellation system is coupled, is provided to the synchronous detector, a signal controller having an output and which generates a cancellation signal for cancelling a residual interfering signal on the receive signal path of the radio receiver system, the signal controller having an insertion loss which is adjustable between a high value and a low value, a summer coupler electrically coupled to the output of the signal controller and to the receive signal path, a sample coupler electrically coupled to the synchronous detector and to the receive signal path for generating the error signal, and a reference coupler for sampling an interference signal and generating the reference signal, the interference signal path being defined as a signal path external to the interference cancellation system from the reference coupler to the summer coupler, and the cancellation signal path being defined as a signal path internal to the interference cancellation system from the reference coupler to the summer coupler, the method comprising the steps of:

setting the insertion loss of the signal controller to the high value;

coupling the receive antenna to the receive signal path;

cross correlating the error signal which corresponds to a received interference signal on the receive signal path and the reference signal and generating first cross correlation data in response thereto, the first cross correlation data exhibiting at least one of a peak and a null in amplitude occurring at a first relative time;

setting the insertion loss of the signal controller to the low value;

decoupling the receive antenna from the receive signal path;

cross correlating the error signal which corresponds to an output signal of the signal controller and the reference signal and generating second cross correlation data in response thereto, the second cross correlation data exhibiting at least one of a peak and a null in amplitude occurring at a second relative time;

determining the time difference between one of the occurrence of a peak in the first cross correlation data and a peak in the second cross correlation data and a null in the first cross correlation data and a null in the second cross correlation data; and adjusting the electrical length of one of the interference signal path and the cancellation signal path in accordance with the determined time difference.

3. A method for compensating for time mismatch between an interference signal path and a cancellation signal path in an interference cancellation system, the interference cancellation system being coupled to a radio receiver system having a receive antenna and a receiver which are coupled together to define a receive signal path, the radio receiver system receiving an interfering signal, and being further coupled to a radio transmitter system having a transmit antenna and a transmitter which are coupled together to define a transmit signal path, the radio transmitter system transmitting an interfering signal, the interference cancellation system including a synchronous detector generating an output signal, a signal controller generating an output signal in response to the output signal of the synchronous detector, means coupled to the transmit signal path for generating a reference signal corresponding to a transmitted interfering signal, means coupled to the receive signal path for sampling a signal on the receive signal path and for generating an error signal corresponding thereto, and means coupled to the receive signal path for injecting the output signal of the signal controller onto the receive signal path, the cancellation signal path being defined as a signal path internal to the interference cancellation system from the reference signal generating means through the signal controller and to the signal injecting means, and the interference signal path being defined as a signal path external to the interference cancellation system from the reference signal generating means through the receive antenna and to the signal injecting means, the reference signal and the error signal being provided to the synchronous detector, the method comprising the steps of:

electrically opening the cancellation signal path;

electrically closing the interference signal path;

cross correlating the error signal, which corresponds to a received interfering signal on the receive signal path, with the reference signal and generating first cross correlation data in response thereto, the first cross correlation data exhibiting at least one of a peak and a null in amplitude;

electrically closing the cancellation signal path;

electrically opening the interference signal path;

cross correlating the error signal, which corresponds to the output signal of the signal controller, with the reference signal and generating second cross correlation data in response thereto, the second cross correlation data exhibiting at least one of a peak and a null in amplitude;

determining the difference in time between the occurrence of one of a peak in the first cross correlation data and a peak in the second cross correlation data and a null in the first cross correlation data and a null in the second cross correlation data; and adjusting the effective electrical length of one of the interference signal path and the cancellation signal path in accordance with the determined time difference.

4. Apparatus for compensating for time mismatch between an interference signal path and a cancellation signal path in an interference cancellation system, the interference cancellation system being coupled to a radio receiver system having a receive antenna and a receiver which are coupled together to define a receive signal path, the radio receiver system receiving an interfering signal, and being further coupled to a radio transmitter system having a transmit antenna and a transmitter which are coupled together to define a transmit signal path, the radio transmitter system transmitting an interfering signal, the interference cancellation system including a synchronous detector generating an output signal, a signal controller generating an output signal in response to the output signal of the synchronous detector, means coupled to the transmit signal path for generating a reference signal corresponding to a transmitted interfering signal, means coupled to the receive signal path for sampling a signal on the receive signal path and for generating an error signal corresponding thereto, and means coupled to the receive signal path for injecting the output signal of the signal controller onto the receive signal path, the cancellation signal path being defined as a signal path internal to the interference cancellation system from the reference signal generating means through the signal controller and to the signal injecting means, and the interference signal path being defined as a signal path external to the interference cancellation system from the reference signal generating means through the receive antenna and to the signal injecting means, the apparatus comprising:

means disposed in the interference signal path for selectively electrically opening and closing the interference signal path;

means disposed in the cancellation signal path for selectively electrically opening and closing the cancellation signal path;

a signal correlator, the signal correlator having first adjustable delay means, signal multiplication means and integration means, the first adjustable delay means being responsive to one of the reference signal and the error signal and generating respectively one of a delayed reference signal and a delayed error signal in response thereto, the signal multiplication means being responsive to and electrically multiplying one of the delayed reference signal with the error signal and the reference signal with the delayed error signal and generating an output signal in response thereto, the integration means being responsive to the output signal of the multiplication means and generating a correlation data signal in response thereto and in response to incremental adjustments of the first delay means;

means responsive to the correlation data signal for analyzing the correlation data signal and for generating a time match control signal in response thereto; and second adjustable delay means situated in one of the cancellation signal path and the interference signal path, the second delay means being responsive to the time match control signal and adjusting the second delay means in response thereto.

5. Apparatus as defined by claim 4, wherein the first adjustable delay means includes a programmable delay line.

6. Apparatus as defined by claim 4, wherein the second adjustable delay means includes a programmable delay line.

7. Apparatus as defined by claim 4, wherein the means for selectively electrically opening and closing the interference signal path includes an RF switch.

8. Apparatus as defined by claim 7, wherein the RF switch is situated in the receive signal path and interposed between the receive antenna and the signal injecting means.

9. Apparatus as defined by claim 4, wherein the means for selectively electrically opening and closing the cancellation signal path includes one of an RF switch and a programmable attenuator.

10. Apparatus as defined by claim 9, wherein the one of the RF switch and programmable attenuator is situated in the cancellation signal path and interposed between at least one of the reference signal generating means and the signal controller and the signal controller and the signal injecting means.

11. Apparatus as defined by claim 4, wherein the means for selectively electrically opening and closing the cancellation signal path includes the signal controller of the interference cancellation system, the signal controller having an adjustable insertion loss which is adjustable between a high and a low value.

12. Apparatus as defined by claim 11, wherein the signal controller includes at least a portion of an acoustic charge transport device.

13. Apparatus as defined by claim 4, wherein the signal multiplication means of the signal correlator includes at least a portion of the synchronous detector of the interference cancellation system.

14. Apparatus as defined by claim 4, wherein the signal correlator includes at least a portion of an acoustic charge transport device.

15. Apparatus for compensating for time mismatch between an interference signal path and a cancellation signal path in an interference cancellation system, the interference cancellation system being coupled to a radio receiver system having a receive antenna and a receiver which are coupled together to define a receive signal path, the radio receiver system receiving an interfering signal transmitted from an interfering signal source, the interference cancellation system including a synchronous detector generating an output signal, a signal controller generating an output signal in response to the output signal of the synchronous detector, means for generating a reference signal corresponding to a transmitted interfering signal, means coupled to the receive signal path for sampling a signal on the receive signal path and for generating an error signal corresponding thereto, and means coupled to the receive signal path for injecting the output signal of the signal controller onto the receive signal path, the cancellation signal path being defined as including at least in part a signal path internal to the interference cancellation system from the reference signal generating means through the signal controller and to the signal injecting means, and the interference signal path being defined as a signal path external to the interference cancellation system from the interfering signal source through the receive antenna and to the signal injecting means, the apparatus comprising:

means disposed in the interference signal path for selectively electrically opening and closing the interference signal path;

means disposed in the cancellation signal path for selectively electrically opening and closing the cancellation signal path;

a signal correlator, the signal correlator having first adjustable delay means, signal multiplication means and integration means, the first adjustable delay means being responsive to one of the reference signal and the error signal and generating respectively one of a delayed reference signal and a delayed error signal in response thereto, the signal multiplication means being responsive to and electrically multiplying one of the delayed reference signal with the error signal and the reference signal with the delayed error signal and generating an output signal in response thereto, the integration means being responsive to the output signal of the multiplication means and generating a correlation data signal in response thereto and in response to incremental adjustments of the first delay means;

means responsive to the correlation data signal for analyzing the correlation data signal and for generating a time match control signal in response thereto; and second adjustable delays means situated in one of the cancellation signal path and the interference signal path, the second delay means being responsive to the time match control signal and adjusting the second delay means in response thereto.

16. A method for compensating for time mismatch between an interference signal path and a cancellation signal path in an interference cancellation system, the interference cancellation system being coupled to a radio receiver system having a receive antenna and a receiver which are coupled together to define a receive signal path, the radio receiver system receiving an interfering signal transmitted from an interfering signal source, the interference cancellation system including a synchronous detector generating an output signal, a signal controller generating an output signal in response to the output signal of the synchronous detector, means for generating a reference signal corresponding to a transmitted interfering signal, means coupled to the receive signal path for sampling a signal on the receive signal path and for generating an error signal corresponding thereto, and means coupled to the receive signal path for injecting the output signal of the signal controller onto the receive signal path, the cancellation signal path being defined as including at least in part a signal path internal to the interference cancellation system from the reference signal generating means through the signal controller and to the signal injecting means, and the interference signal path being defined as a signal path external to the interference cancellation system from the interfering signal source through the receive antenna and to the signal injecting means, the reference signal and the error signal being provided to the synchronous detector, the method comprising the steps of:

electrically opening the cancellation signal path;

electrically closing the interference signal path;

cross correlating the error signal, which corresponds to a received interfering signal on the receive signal path, with the reference signal and generating first cross correlation data in response thereto, the first cross correlation data exhibiting at least one of a peak and a null in amplitude;

electrically closing the cancellation signal path;

electrically opening the interference signal path;

cross correlating the error signal, which corresponds to the output signal of the signal controller, with the reference signal and generating second cross correlation data in response thereto, the second cross correlation data exhibiting at least one of a peak and a null in amplitude;

determining the difference in time between the occurrence of one of a peak in the first cross correlation data and a peak in the second cross correlation data and a null in the first cross correlation data and a null in the second cross correlation data; and adjusting the effective electrical length of one of the interference signal path and the cancellation signal path in accordance with the determined time difference.

* * * * *